(12) United States Patent
Kim

(10) Patent No.: US 9,843,282 B2
(45) Date of Patent: Dec. 12, 2017

(54) MOTOR CONTROL APPARATUS FOR VEHICLES AND CURRENT REFERENCE GENERATION METHOD USING THE SAME

(71) Applicant: Hyundai Mobis Co., Ltd., Seoul (KR)

(72) Inventor: Sang Min Kim, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/379,395

(22) Filed: Dec. 14, 2016

(65) Prior Publication Data
US 2017/0170766 A1  Jun. 15, 2017

(30) Foreign Application Priority Data
Dec. 14, 2015  (KR) .......................... 10-2015-0178055

(51) Int. Cl.
| H02P 27/06 | (2006.01) |
| H02P 21/22 | (2016.01) |
| H02P 6/28 | (2016.01) |
| B60L 3/12 | (2006.01) |
| B60L 15/08 | (2006.01) |
| G05B 19/18 | (2006.01) |
| H02P 21/00 | (2016.01) |
| H02P 27/08 | (2006.01) |

(52) U.S. Cl.
CPC ............... *H02P 21/22* (2016.02); *B60L 3/12* (2013.01); *B60L 15/08* (2013.01); *G05B 19/182* (2013.01); *H02P 6/28* (2016.02); *H02P 21/0021* (2013.01); *H02P 27/08* (2013.01); *B60L 2240/429* (2013.01); *G05B 2219/41112* (2013.01)

(58) Field of Classification Search
CPC ............. H02P 27/06; H02P 21/22; B60L 3/10
USPC ............................ 318/139, 400.33, 727, 801
See application file for complete search history.

(56) References Cited

U.S. PATENT DOCUMENTS

2014/0217935 A1* 8/2014 Matsui .................... H02P 27/06
318/139

* cited by examiner

*Primary Examiner* — Jorge L Carrasquillo
*Assistant Examiner* — Cortez Cook
(74) *Attorney, Agent, or Firm* — H.C. Park & Associates, PLC

(57) ABSTRACT

Provided is a motor control apparatus for vehicles. The motor control apparatus may generate a current reference value based on a level of a field current (or a field current value) flowing in a field coil and may control a vehicle motor by using the current reference value, thereby improving torque response characteristic and maximum efficiency.

12 Claims, 18 Drawing Sheets

MOTOR CONTROL APPARATUS FOR VEHICLES AND CURRENT REFERENCE GENERATION METHOD USING THE SAME

CROSS-REFERENCE TO RELATED APPLICATIONS

This application claims priority from and the benefit of Korean Patent Application No. 10-2015-0178055, filed on Dec. 14, 2015, which is hereby incorporated by reference for all purposes as if set forth herein.

BACKGROUND

Field

The present invention relates to a motor control apparatus for vehicles and a current reference generation method using the same, and more particularly, to a motor control apparatus for vehicles and a current reference generation method using the same, which control a field winding type motor.

Discussion of the Background

A control system for controlling a motor (hereinafter referred to as a field winding type motor) using a winding type field is largely configured with a field circuit and a stator circuit.

The field circuit is largely configured with a field inverter and a field coil connected to the field inverter. The stator circuit is largely configured with a stator inverter and a stator coil connected to the stator inverter.

However, since the field coil of the field circuit is wound by hundreds of turns, an inductance of the field coil is high, and for this reason, a time constant of the field circuit itself is large, whereby current response characteristic is slow. Particularly, in a 48V battery system for vehicles, when a direct current (DC) link voltage is low, a field voltage capable of being applied to the field circuit is low, and for this reason, there is a limitation in increasing current control response characteristic. In order to increase the current control response characteristic, the number of turns of the field coil should be reduced, and a coil diameter should be enlarged. In this case, however, a level of a current becomes higher, and for this reason, a size of a power semiconductor of the field inverter should increase.

As described above, since the time constant of the field circuit is large, a field current flowing in the field coil is controlled to about several tens ms which is slow, and for this reason, a torque response characteristic of the motor also becomes slower. On the other hand, a d-axis and a q-axis current which flow in the stator coil of the stator circuit may be controlled to within several milliseconds (ms) which is relatively fast.

For this reason, when the field winding type motor is controlled to operate at only maximum efficiency, as illustrated in FIG. 1, a torque response is slow in a problem region "$t_2$-$t_3$" of a torque, and the motor cannot operate at high efficiency in a problem region "$t_2$-$t_3$" of the field current.

SUMMARY

Exemplary embodiments provide a motor control apparatus for vehicles and a current reference generation method using the same, which improve both a torque response and an efficiency of a motor.

In one exemplary embodiment, a motor control apparatus for vehicles includes: a stator current reference generator configured to generate a stator current reference value mapped to a torque reference value $T_e^*$, a magnetic flux reference value $\lambda^*$, and a current field current value $i_f$ flowing in a field coil by using a first stator current map in a quick-response torque control mode, and generate a stator current reference value mapped to a filtered torque reference value $T_{e1}^*$ generated by filtering the torque reference value $T_e^*$, the magnetic flux reference value $\lambda^*$, and the field current value $i_f$ by using a second stator current map in a maximum efficiency control mode; a field current reference generator configured to generate a field current reference value mapped to the torque reference value $T_e^*$ and the magnetic flux reference value $\lambda^*$ by using a first field current map in the quick-response torque control mode, and generate a field current reference value mapped to the filtered torque reference value $T_{e1}^*$ and the magnetic flux reference value $\lambda^*$ by using a second field current map in the maximum efficiency control mode; and a pulse width modulation (PWM) controller configured to apply a first PWM signal corresponding to the stator current reference value to a stator inverter and apply a second PWM signal corresponding to the field current reference value to a field inverter, thereby controlling a torque response characteristic and a maximum efficiency of a vehicle motor driven by the stator inverter and the field inverter.

In another exemplary embodiment, a current reference generation method includes: generating a stator current reference value mapped to a torque reference value $T_e^*$, a magnetic flux reference value $\lambda^*$, and a current field current value $i_f$ flowing in a field coil by using a first stator current map in a quick-response torque control mode, and generating a stator current reference value mapped to a filtered torque reference value $T_{e1}^*$ generated by filtering the torque reference value $T_e^*$, the magnetic flux reference value $\lambda^*$, and the field current value $i_f$ by using a second stator current map in a maximum efficiency control mode; and generating a field current reference value mapped to the torque reference value $T_e^*$ and the magnetic flux reference value $\lambda^*$ by using a first field current map in the quick-response torque control mode, and generating a field current reference value mapped to the filtered torque reference value $T_{e1}^*$ and the magnetic flux reference value $\lambda^*$ by using a second field current map in the maximum efficiency control mode.

Other aspects and exemplary embodiments will be apparent from the following detailed description, the drawings, and the claims.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
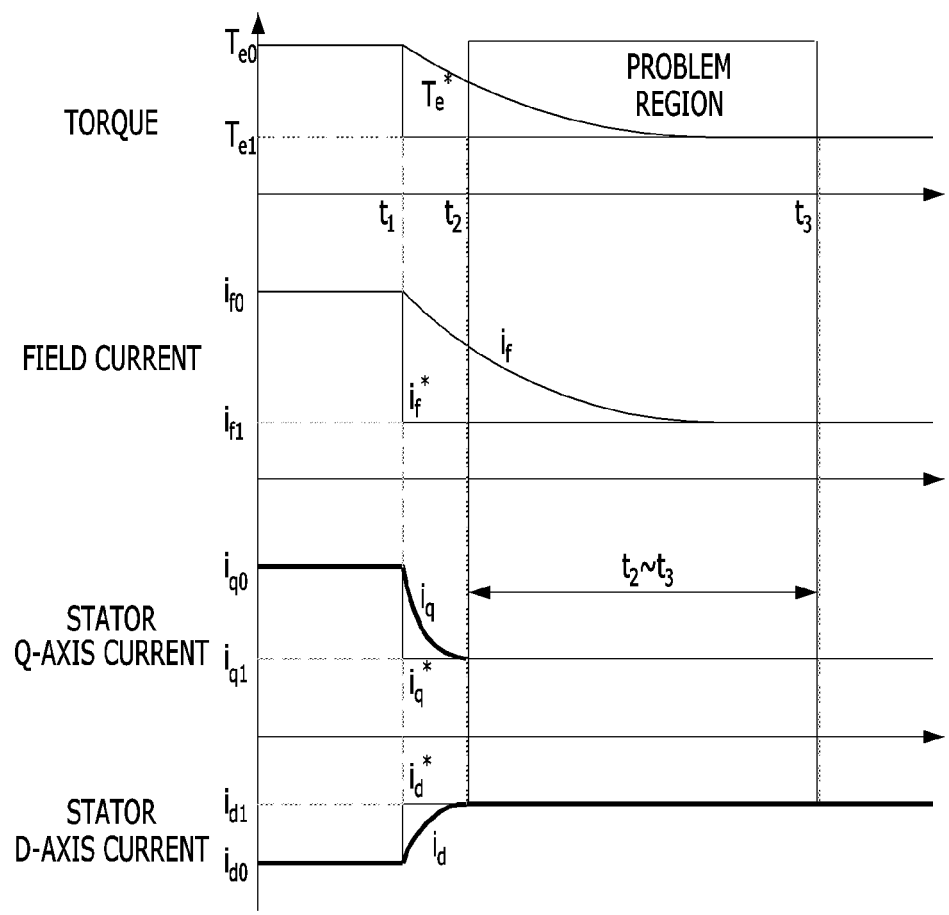
FIG. 1 is a graph showing torque response characteristic and a field current with respect to time for describing problems of a related art motor control system.

Hereinafter, embodiments of the present invention will be described in detail with reference to the accompanying drawings. Throughout the specification, like reference numerals denote like elements having the same or similar functions. Detailed description of components or functions apparent to those skilled in the art will be omitted for clarity. It should be understood that the following exemplary embodiments are provided by way of example and that the present invention is not limited to the exemplary embodiments disclosed herein and can be implemented in different forms by those skilled in the art. It should be noted that the drawings are not to precise scale and may be exaggerated in thickness of lines or sizes of components for descriptive convenience and clarity only.

It will be understood that although the terms including an ordinary number such as first or second are used herein to describe various elements, these elements should not be limited by these terms. These terms are only used to distinguish one element from another element. For example, a first element may be referred to as a second element without departing from the spirit and scope of the present invention, and similarly, the second element may also be referred to as the first element. In the following description, the technical terms are used only for explain a specific exemplary embodiment while not limiting the present invention. The terms of a singular form may include plural forms unless referred to the contrary.

Terms used in the present invention have been selected as general terms which are widely used at present, in consideration of the functions of the present invention, but may be altered according to the intent of an operator of ordinary skill in the art, conventional practice, or introduction of new technology. Also, if there is a term which is arbitrarily selected by the applicant in a specific case, in which case a meaning of the term will be described in detail in a corresponding description portion of the present invention. Therefore, the terms should be defined on the basis of the entire content of this specification instead of a simple name of each of the terms.

In this disclosure below, when it is described that one comprises (or includes or has) some elements, it should be understood that it may comprise (or include or has) only those elements, or it may comprise (or include or have) other elements as well as those elements if there is no specific limitation. Moreover, each of terms such as "unit", "apparatus" and "module" described in specification denotes an element for performing at least one function or operation, and may be implemented in hardware, software or the combination of hardware and software.

Figure 2:
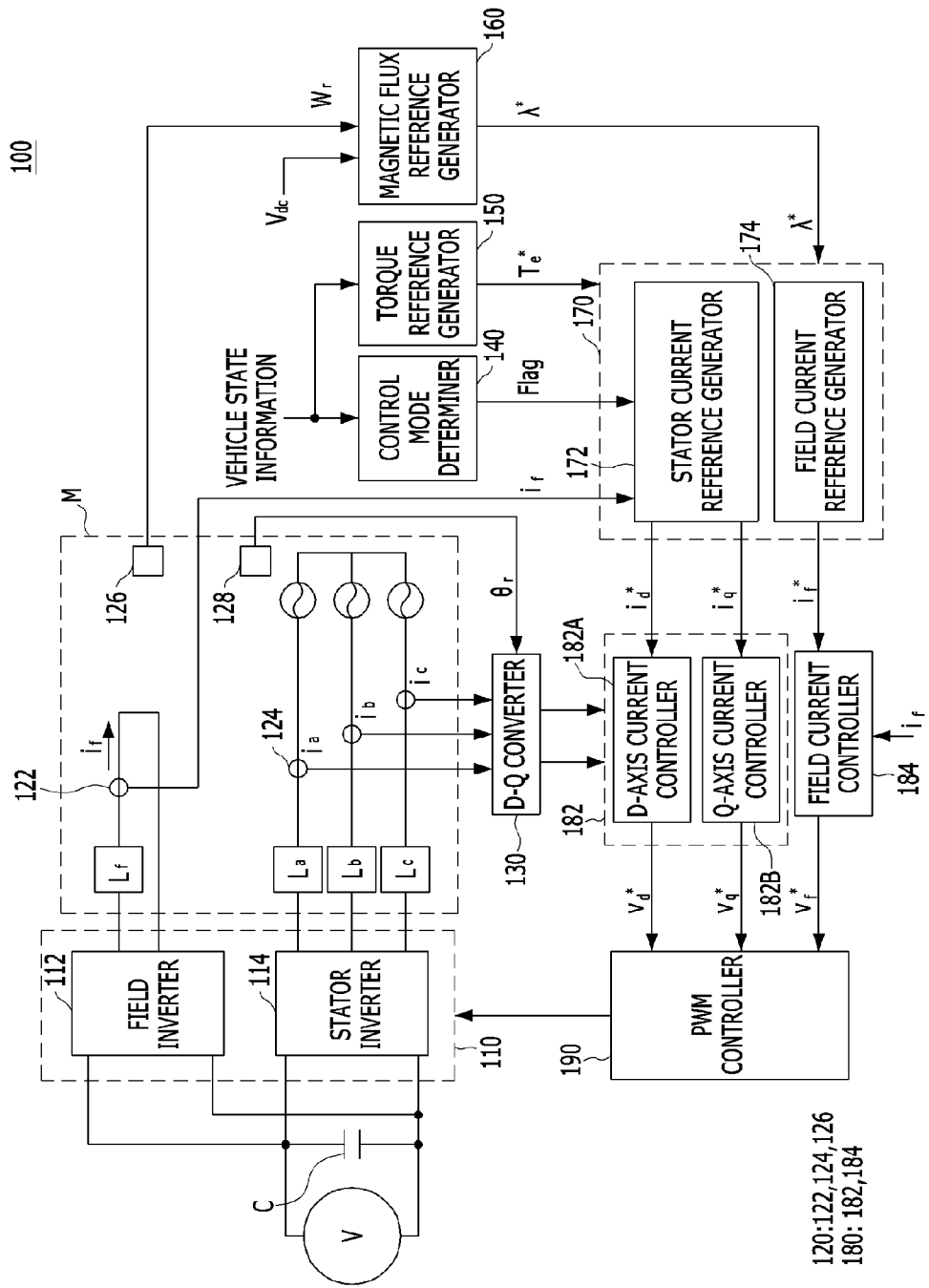
FIG. 2 is a diagram schematically illustrating a motor control apparatus for vehicles according to an exemplary embodiment.
Figure 3:
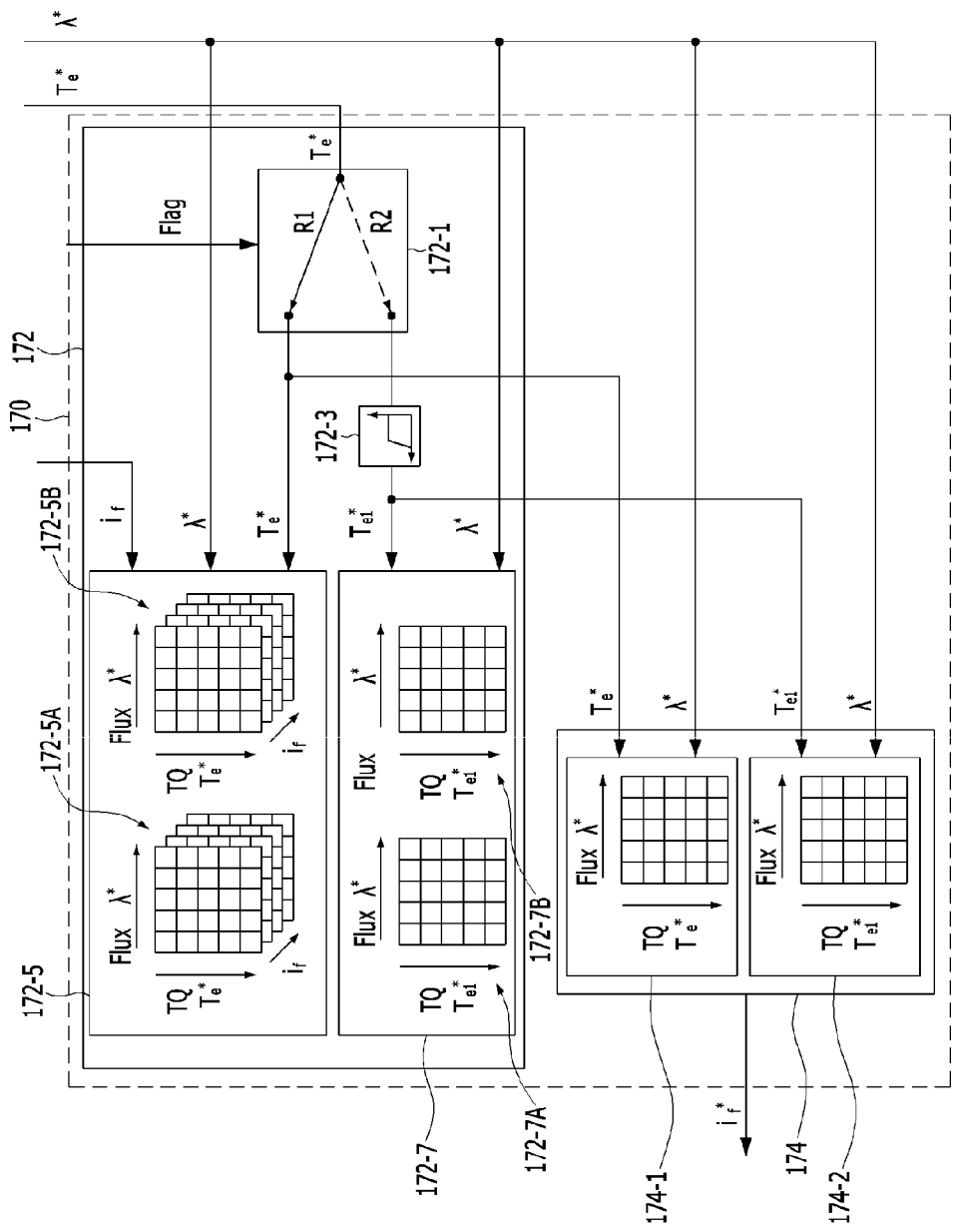
FIG. 3 is a diagram schematically illustrating an internal configuration of a current reference generator illustrated in FIG. 1.

FIG. 2 is a diagram schematically illustrating a motor control apparatus 100 for vehicles according to an exemplary embodiment, and FIG. 3 is a diagram schematically illustrating an internal configuration of a current reference generator illustrated in FIG. 1.

Referring to FIG. 2, the motor control apparatus 100 for vehicles according to an exemplary embodiment may be an apparatus for controlling an operation of a vehicle motor M. The vehicle motor M may be a claw-pole shaped motor or a field winding type motor.

The motor control apparatus 100 for vehicles according to an exemplary embodiment may adaptively perform quick-response torque control for preferentially controlling a torque response of the vehicle motor and maximum efficiency control for preferentially controlling a maximum efficiency of the vehicle motor.

To this end, the motor control apparatus 100 for vehicles according to an exemplary embodiment may generate a field-current reference and a stator-current reference for adaptively performing the quick-response torque control and the maximum efficiency control.

In order to adaptively perform the quick-response torque control and the maximum efficiency control according to the field-current reference and the stator-current reference, the motor control apparatus 100 may include an inverter 110, a sensor 120, a d-q converter 130, a control mode determiner 140, a torque reference generator 150, a magnetic flux reference generator 160, a current reference generator 170, a current controller 180 (including a stator current controller 182 and a field current controller 184), and a pulse width modulation (PWM) controller 190. Hereinafter, the elements will be described in detail.

Inverter 110

The inverter 110 may be electrically connected to a vehicle battery voltage $V_{dc}$ by a DC link capacitor C. The inverter 110 may receive the vehicle battery voltage $V_{dc}$, transferred through the DC link capacitor C, as a DC link input voltage and may apply a motor driving voltage, obtained by varying a level and a frequency of the DC link input voltage, to the motor M.

The inverter 110 may include a field inverter 112 and a stator inverter 114 which are connected to the DC link capacitor C in parallel.

The field inverter 112 may be electrically connected to a field coil $L_f$ of the motor M and may apply a field motor driving voltage to the field coil $L_f$.

The stator inverter 114 may be electrically connected to stator coils $L_a$, $L_b$, and $L_c$ of the motor M and may apply a stator motor driving voltage to the coils $L_a$, $L_b$, and $L_c$ of the motor M.

In an exemplary embodiment, circuit configurations of the inverters 112 and 114 are not features of the inventive concept, and thus, their detailed descriptions are omitted.

Sensor 120

The sensor 120 may include a field current sensor 122 that measures in real time a field current value $i_f$ flowing in the field coil $L_f$, a stator current sensor 124 that measures in real time three-phase stator current values $i_a$, $i_b$, and $i_c$ respectively flowing in the stator coils $L_a$, $L_b$, and $L_c$, a rotation speed sensor 126 that measures in real time a rotation speed $W_r$ of a motor rotor of the motor M, and a phase sensor 128 that measures in real time a phase angle $\theta_r$ of the motor M.

d-q Converter 130

The d-q converter 130 may receive the three-phase stator current values $i_a$, $i_b$, and $i_c$ from the stator current sensor 124 and the phase angle $\theta_r$ from the phase sensor 128, and may convert the three-phase stator current values $i_a$, $i_b$, and $i_c$ into a d-axis current component $i_d$ (hereinafter referred to as a d-axis current value) and a q-axis current component $i_q$ (hereinafter referred to as a q-axis current value) by using the received three-phase stator current values $i_a$, $i_b$, and $i_c$ and phase angle $\theta_r$.

Control Mode Determiner 140

The control mode determiner 140 may determine a control mode for controlling the motor, based on vehicle state information received from an upper controller (not shown). Here, the control mode determiner 140 and the upper controller may be communicated and connected to each other through controller area network (CAN) communication and may receive the vehicle state information through the CAN communication.

The control mode may include a quick-response torque control mode for controlling the motor M, preferentially based on a torque response of the motor M and a maximum efficiency control mode for controlling the motor M, preferentially based on an efficiency of the motor M.

That is, the control mode determiner 140 may analyze the vehicle state information received from the upper controller to determine the control mode of the motor M as the quick-response torque control mode or the maximum efficiency control mode. Here, the vehicle state information may include driving state information about a vehicle, charging amount information about a vehicle battery $V_{dc}$, and electricity load information. Here, the driving state information may be speed information indicating whether the vehicle is currently driving at a high speed equal to or more than a reference speed or is currently driving at less than the reference speed.

It is preferable that when a vehicle is currently driving at a high speed, the control mode determiner 140 preferentially considers a torque response. Therefore, when a current mode is the maximum efficiency control mode, the control mode determiner 140 may change the maximum efficiency control mode to the quick-response torque control mode. Also, it is preferable that when a charging amount of the vehicle battery is not sufficient, an efficiency of the motor is preferentially considered. Therefore, when a current mode is the quick-response torque control mode, the control mode determiner 140 may change the quick-response torque control mode to the maximum efficiency control mode.

The quick-response torque control mode may be defined as a dynamic drive mode (DDM) depending on automotive engineering or a vehicle designer, and the maximum efficiency control mode may be defined as an eco-drive mode (EDM).

When a current control mode is changed to the quick-response torque control mode or the maximum efficiency control mode, the control mode determiner 140 may generate a flag signal Flag indicating the changed control mode and may output the generated flag signal Flag to the current reference generator 170. Here, the flag signal Flag may include a first flag signal Flag$_{DDM}$ indicating the quick-response torque control mode and a second flag signal Flag$_{EDM}$ indicating the maximum efficiency control mode. That is, when the control mode determiner 140 changes a current control mode to the quick-response torque control mode according to the vehicle state information, the control mode determiner 140 may output the first flag signal Flag$_{DDM}$ to the current reference generator 170, and when the control mode determiner 140 changes a current control mode to the maximum efficiency control mode, the control mode determiner 140 may output the second flag signal Flag$_{EDM}$ to the current reference generator 170.

Torque Reference Generator 150

The torque reference generator 150 may generate a torque reference value $T_e^*$, based on the vehicle state information received through the CAN communication from the upper controller (not shown) and may output the generated torque reference value $T_e^*$ to the current reference generator 170. Here, the upper controller may directly supply the torque reference value $T_e^*$ to the current reference generator 170. In this case, the torque reference generator 150 may not be illustrated in the FIG. 2.

Magnetic Flux Reference Generator 160

The magnetic flux reference generator 160 may generate a magnetic flux reference value $\lambda^*$ by using the DC link input voltage $V_{dc}$ and the rotation speed $W_r$ of the motor M received from the rotation speed sensor 126 and may output the generated magnetic flux reference value $\lambda^*$ to the current reference generator 170. Here, the magnetic flux reference value $\lambda^*$ may be calculated by $V_{dc}/W_r$.

Current Reference Generator 170

The current reference generator 170 may be an element that generates a current reference value including stator current reference values $i_d^*$ and $i_q^*$ and a field current reference value $i_f^*$ by using a current field current value $i_f$ from the field current sensor 122, the flag signal Flag from the control mode determiner 140, the torque reference value $T_e^*$ from the torque reference generator 150, and the magnetic flux reference value $\lambda^*$ from the magnetic flux reference generator 160. Particularly, the current field generator 170 may generate the current reference value which is very useful for selectively (or adaptively) calculating a maximum efficiency or a torque response of the motor M according to a control mode indicated by the flag signal Flag.

To this end, the current reference generator 170 may include a stator current reference generator 172 and a field current reference generator 174.

Stator Current Reference Generator 172

The stator current reference generator 172 may generate the stator current reference values $i_d^*$ and $i_q^*$ preferentially based on the torque response of the motor M or the stator current reference values $i_d^*$ and $i_q^*$ preferentially based on the maximum efficiency of the motor M.

As illustrated in FIG. 3, the stator current reference generator 172 may include a path generator 172-1, a low pass filter (LPF) 172-3, a first stator current map 172-5, and a second stator current map 172-7. In the present embodiment, the path generator 172-1 and the low pass filter (LPF) 172-3 are described as being designed inside the stator current reference generator 172, but may be designed outside the stator current reference generator 172 without being limited thereto.

In response to the flag signal Flag from the control mode determiner 140, the path generator 172-1 may generate a first path R1, through which the torque reference value $T_e^*$ from the torque reference generator 150 is transferred to the first stator current map 172-5, and a second path R2 through which the torque reference value $T_e^*$ is transferred to the second stator current map 172-7. In detail, the path generator 172-1 may generate the first path R1 in response to the first flag signal Flag$_{DDM}$ indicating the quick-response torque control mode and may generate the second path R2 in response to the second flag signal Flag$_{EDM}$ indicating the maximum efficiency control mode.

The low pass filter 172-3 may filter the torque reference value $T_e^*$ transferred through the second path R2 to generate a filtered torque reference value $T_{e1}^*$. The low pass filter 172-3 may change the torque reference value $T_e^*$ to the filtered torque reference value $T_{e1}^*$ generated through the low-pass filtering, based on a response characteristic of a field circuit including the field coil $L_f$, and thus, a stator current reference value generated based on the filtered torque reference value $T_{e1}^*$ improves the maximum efficiency of the motor M.

The first stator current map 172-5 may be a current map used for quick-response torque control and may include a 1-1st d-axis current map 172-5A and a 1-2nd q-axis current map 172-5B used for the quick-response torque control.

The 1-1st d-axis current map 172-5A may include a plurality of d-axis current maps classified by levels of a current field current value $i_f$, and each of the plurality of d-axis current maps may store a plurality of d-axis current reference values $i_d^*$ which have been previously obtained in order for the loss of the motor M to be the minimum in the torque reference value $T_e^*$ which is currently input and the magnetic flux reference value $\lambda^*$ which is currently input. That is, each of the plurality of d-axis current reference values $i_d^*$ may be set to a value where motor efficiency is the highest, based on levels of a field current.

The 1-1st d-axis current map 172-5A may receive, as input variables, a current field current value $i_f$ transferred from the field current sensor 122, a current torque reference value $T_e^*$ transferred from the torque reference generator 150 through the first path R1, and a current magnetic flux reference value $\lambda^*$ transferred from the magnetic flux reference generator 160 and may output (calculate or extract) a d-axis current reference value $i_d^*$ mapped to each of the input variables.

The 1-2nd q-axis current map 172-5B may include a plurality of q-axis current maps classified by levels of the current field current value $i_f$, and each of the plurality of q-axis current maps may store a plurality of q-axis current reference values $i_q^*$ which have been previously obtained in order for the loss of the motor M to be the minimum in the torque reference value $T_e^*$ which is currently input and the magnetic flux reference value $\lambda^*$ which is currently input. That is, each of the plurality of q-axis current reference values $i_q^*$ may be set to a value where motor efficiency is the highest, based on levels of a field current.

The 1-2nd q-axis current map 172-5B may receive, as input variables, the current field current value $i_f$ transferred from the field current sensor 122, the current torque reference value $T_e^*$ transferred from the torque reference generator 150 through the first path R1, and the current magnetic flux reference value $\lambda^*$ transferred from the magnetic flux reference generator 160 and may output a q-axis current reference value $i_q^*$ mapped to each of the input variables.

The second stator current map 172-7 may be a current map used for maximum efficiency control and may include a 2-1st d-axis current map 172-7A and a 2-2nd q-axis current map 172-7B.

The 2-1st d-axis current map 172-7A may store a plurality of d-axis current reference values $i_d^*$ which have been previously obtained in order for the motor M to operate at maximum efficiency in a current filtered torque reference value $T_{e1}^*$ generated through the low-pass filtering and a current magnetic flux reference value $\lambda^*$. The 2-1st d-axis current map 172-7A may receive, as input variables, the current filtered torque reference value $T_{e1}^*$ generated through the low-pass filtering by the low pass filter 127-3 and the current magnetic flux reference value $\lambda^*$ transferred from the magnetic flux reference generator 160 and may output a d-axis current reference value $i_d^*$ mapped to each of the input variables.

The 2-2nd q-axis current map 172-7B may store the plurality of q-axis current reference values $i_q^*$ which have been previously obtained in order for the motor M to operate at maximum efficiency control mode in the current filtered torque reference value $T_{e1}^*$ generated through the low-pass filtering and the current magnetic flux reference value $\lambda^*$. The 2-2nd q-axis current map 172-7B may receive, as input variables, the current filtered torque reference value $T_{e1}^*$ generated through the low-pass filtering by the low pass filter 127-3 and the current magnetic flux reference value $\lambda^*$ transferred from the magnetic flux reference generator 160 and may output a q-axis current reference value $i_q^*$ mapped to each of the input variables.

Field Current Reference Generator 174

The field current reference generator 174 may generate the field current reference value $i_f^*$ preferentially based on the torque response of the motor M or the stator current reference values $i_d^*$ and $i_q^*$ preferentially based on the maximum efficiency of the motor M.

As illustrated in FIG. 3, the field current reference generator 174 may include a first field current map 174-1 used for the quick-response torque control and a second field current map 174-2 used for the maximum efficiency control.

The first field current map 174-1 may store a plurality of field current reference values $i_f^*$ which have been previously obtained in order for the motor M to operate at maximum efficiency control mode in the torque reference value $T_e^*$ and the magnetic flux reference value $\lambda^*$.

The first field current map 174-1 may receive, as input variables, a current magnetic flux reference value $\lambda^*$ and a current torque reference value $T_e^*$ transferred through the first path R1 generated by the path generator 172-1 and may output (extract) a field current reference value $i_f^*$ mapped to each of the input variables.

The second field current map 174-2 may store a plurality of field current reference values $i_f^*$ which have been previously obtained in order for the motor M to operate at maximum efficiency control mode in the current magnetic flux reference value $\lambda^*$ and the current filtered torque reference value $T_{e1}^*$ generated through the low-pass filtering.

The second field current map 174-2 may receive, as input variables, the current magnetic flux reference value $\lambda^*$ and the current filtered torque reference value $T_{e1}^*$ generated through the low-pass filtering by the low-pass filter 172-3 and may output (extract) a field current reference value $i_f^*$ mapped to each of the input variables.

Current Controller 180 (182 and 184)

Referring again to FIG. 2, the current controller 180 may include a stator current controller 182 and a field current controller 184.

The stator current controller 182 may include a d-axis current controller 182A and a q-axis current controller 182B.

The d-axis current controller 182A may generate a d-axis voltage reference value $V_d^*$ by using the d-axis current reference value $i_d^*$ output from the stator current reference generator 172 and the d-axis current value $i_d^*$ output from the d-q converter 130. Here, for example, the d-axis voltage reference value $V_d^*$ may be calculated from a deviation between the d-axis current reference value $i_d^*$ and the d-axis current value $i_d^*$ by using a proportional-integral (PI) operation method.

The q-axis current controller 182B may generate a q-axis voltage reference value $V_q^*$ by using the q-axis current reference value $i_q^*$ output from the stator current reference generator 172 and the q-axis current value $i_q$ output from the d-q converter 130. Here, for example, the q-axis voltage reference value $V_q^*$ may be calculated from a deviation between the q-axis current reference value $i_q^*$ and the q-axis current value $i_q$ by using the PI operation method.

The field current controller 184 may generate a field voltage reference value $V_f^*$ by using the field current reference value $i_f^*$ output from the field current reference generator 174 and the field current value $i_f$ output from the field current sensor 122. Here, for example, the field voltage reference value $V_f^*$ may be calculated from a deviation between the field current reference value $i_f^*$ and the field current value $i_f$.

PWM Controller 190

The PWM controller 190 may generate a first PWM duty value, corresponding to the d-axis voltage reference value output from the d-axis current controller 182A, and a second PWM duty value corresponding to the q-axis voltage reference value $V_q^*$ output from the q-axis current controller 182B and may control switches (not shown) of the stator inverter 114 based on the first and second PWM duty values in order for the motor M to operate at an improved torque response or maximum efficiency.

Moreover, the PWM controller 190 may generate a third PWM duty value corresponding to the field voltage reference value $V_f^*$ output from the field current controller 184 and may control switches (not shown) of the field inverter 112 based on the third PWM duty value in order for the motor M to operate at maximum efficiency.

Hereinafter, a method of generating a first stator current map used for quick-response torque control, a second stator current map used for maximum efficiency control, and a field current map used for the maximum efficiency control according to an exemplary embodiment will be described.

Generation of First Stator Current Map 172-5 Used for Quick-Response Torque Control First, a torque and a magnetic flux value corresponding to a field current and a stator d-axis current and a torque and a magnetic flux corresponding to a d-axis current may be measured through experiment.

Subsequently, the stator current map 172-5 satisfying a torque reference value and a magnetic flux reference value may be generated by levels (for example, 0 ampere [A] to 10 ampere [A]) of a field current value). In this case, each of d-axis current reference values and q-axis current reference values may be set to a value where motor loss $W_{loss}$ is the minimum which quickly follows a torque reference, based on a torque response. The motor loss $W_{loss}$ may be expressed as the following Equation (1):

$$W_{loss} = 1.5 R_s (i_d^2 + i_q^2) + R_f i_f^2 \quad (1)$$

where, $R_s$ denotes a stator resistance, $R_f$ denotes a field resistance, $i_d$ denotes a stator d-axis current value, and $i_q$ denotes a stator q-axis current value. Also, $i_f$ denotes a field current value.

As described above, sub-maximal efficiency operation points where the stator current and the field current are low but a phase voltage Vs is high may be checked. Subsequently, d-axis current resistance values corresponding to the checked sub-maximal efficiency operation points may be generated as the first stator current map 172-5 and the 1-1st d-axis current map 172-5A, and d-axis current reference values corresponding to the checked sub-maximal efficiency operation points may be generated as the first stator current map 172-5 and the 1-2nd d-axis current map 172-5B.

The stator current map 172-5 may store different stator current reference values by levels of a field current with respect to the same torque reference value and magnetic flux reference value, and the stator current reference values may consist of values, where motor efficiency is the highest, by levels of the field current.

The following Equation (2) is an equation representing a process of calculating the d-axis current reference value by using the 1-1st d-axis current map 172-5A, and the following Equation (3) is an equation representing a process of calculating the q-axis current reference value by using the 1-2nd d-axis current map 172-5B:

$$i_{dk}^* = \text{Table}(T_e^*, \lambda^*, i_{fk}) k=1,2,\ldots,n \quad (2)$$

where $i_{dk}^*$ denotes a kth d-axis current reference value, Table( ) denotes a function representing a d-axis current map, $T_e^*$ denotes a torque reference value, and $\lambda^*$ denotes a magnetic flux reference value added into Table( ). Also, $i_{fk}$ denotes a kth field current value.

$$i_{qk}^* = \text{Table}(T_e^*, \lambda^*, i_{fk}) k=1,2,\ldots,n \quad (3)$$

where $i_{qk}^*$ denotes a kth q-axis current reference value, Table( ) denotes a function representing a q-axis current map, $T_e^*$ denotes a torque reference value, and $\lambda^*$ denotes a magnetic flux reference value added into Table( ). Also, $i_{fk}$ denotes a kth field current value.

FIGS. 4A, 4B, 5A, 5B, 6A, 6B, 7A, 7B, 8A and 8B are diagrams showing 3D graphs of a d-axis current map and a q-axis current map included in a first stator current map classified by levels of a field current value according to an exemplary embodiment.

Figure 4A:
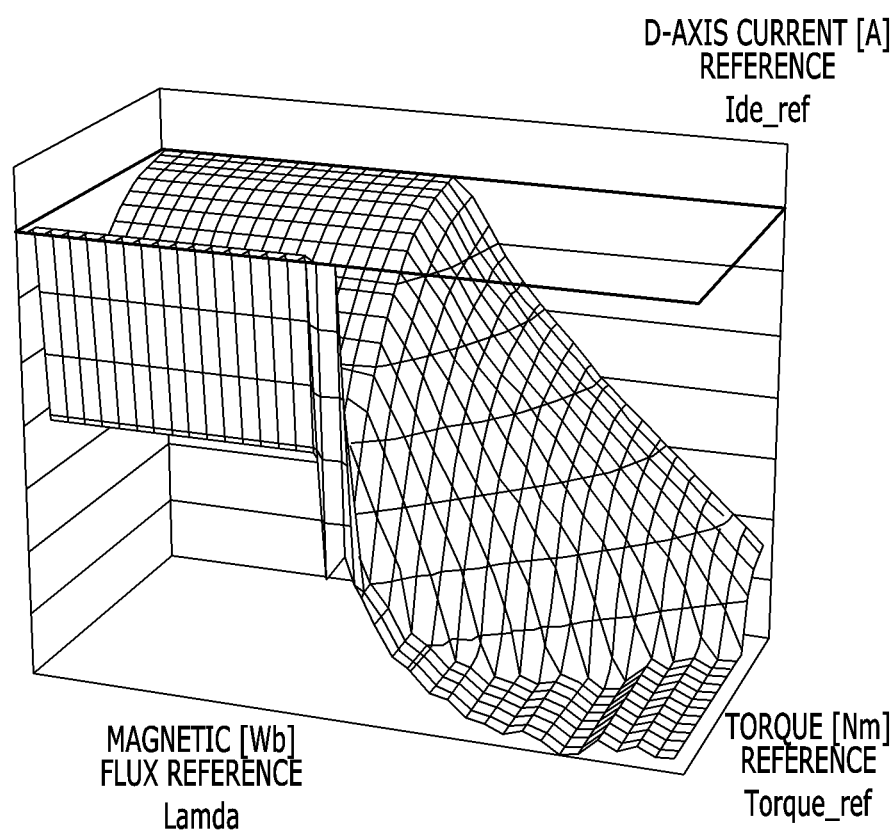
FIGS. 4A, 4B, 5A, 5B, 6A, 6B, 7A, 7B, 8A and 8B are diagrams showing three-dimensional (3D) graphs of first stator current maps by levels of a field current value according to an exemplary embodiment.
Figure 4B:
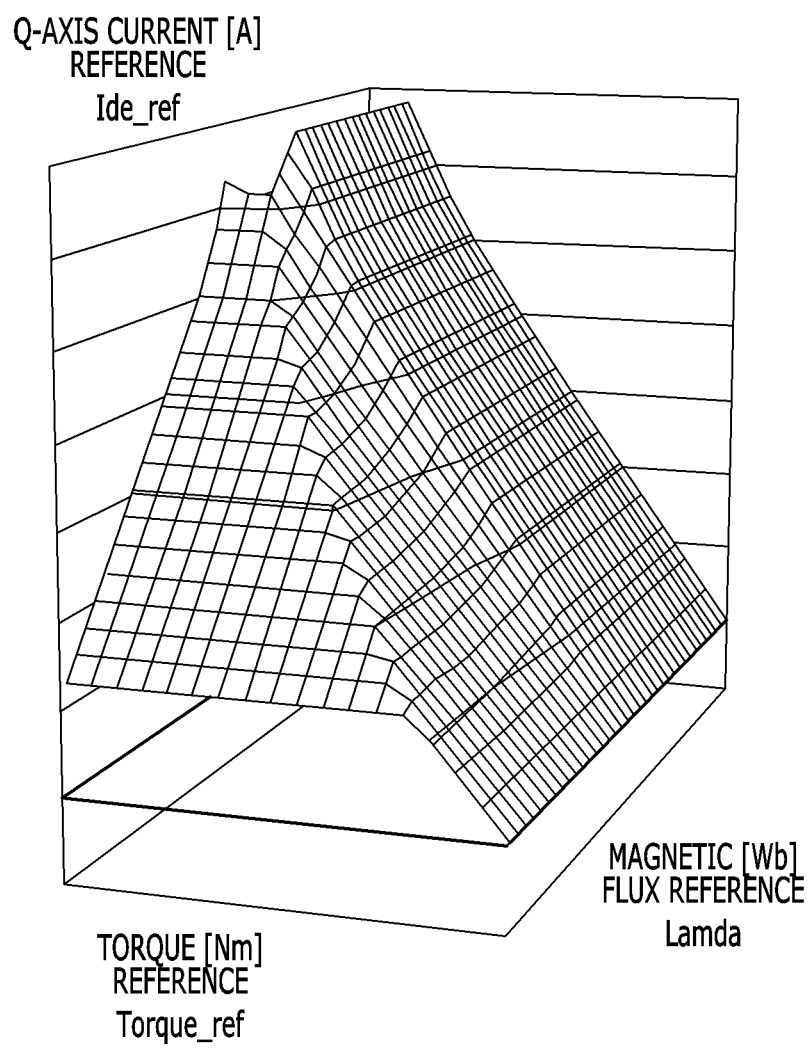

FIG. 4A shows an example of a d-axis current map included in a first stator current map generated from a field current value $i_f$ of 8 ampere [A], and FIG. 4B shows an example of a q-axis current map included in the first stator current map generated from the field current value $i_f$ of 8 ampere [A].

Figure 5A:
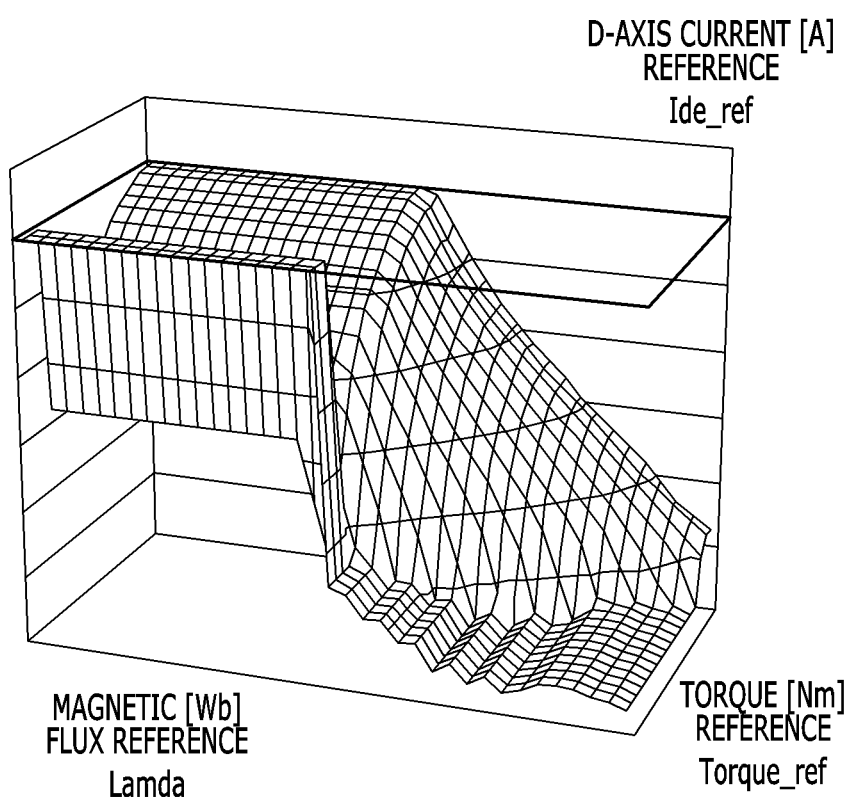
Figure 5B:
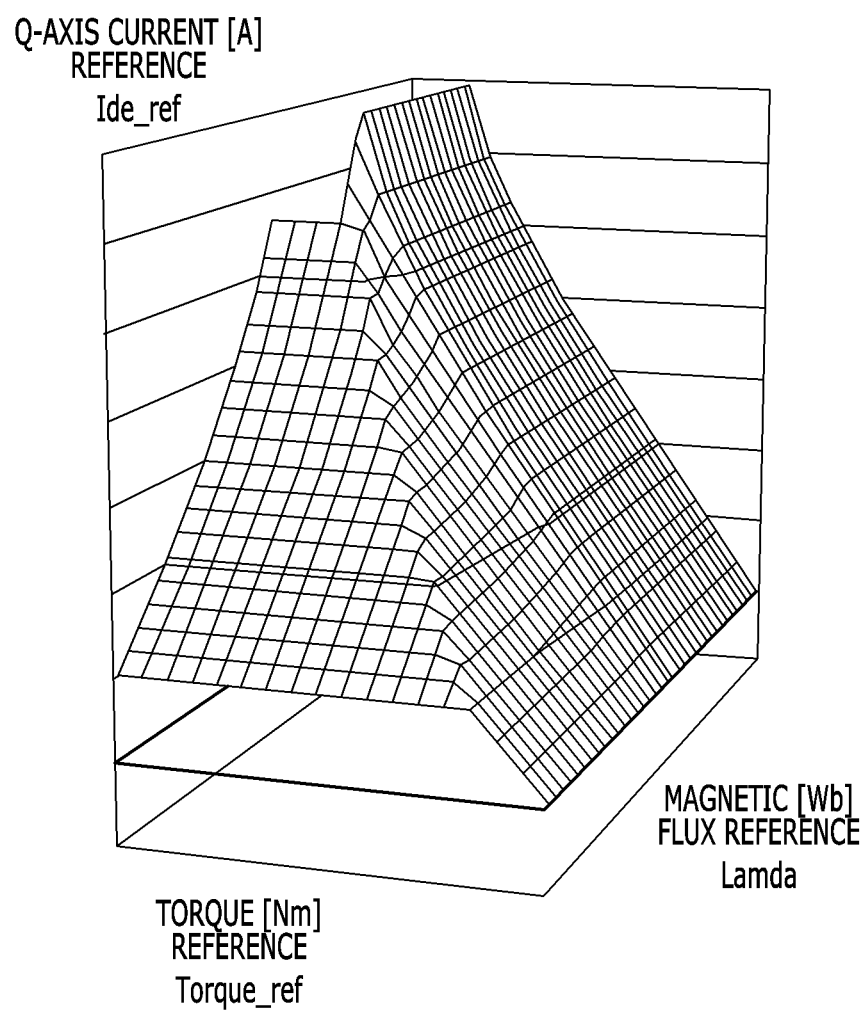

FIG. 5A shows an example of a d-axis current map included in a first stator current map generated from a field current value $i_f$ of 6 ampere [A], and FIG. 5B shows an example of a q-axis current map included in the first stator current map generated from the field current value $i_f$ of 6 ampere [A].

Figure 6A:
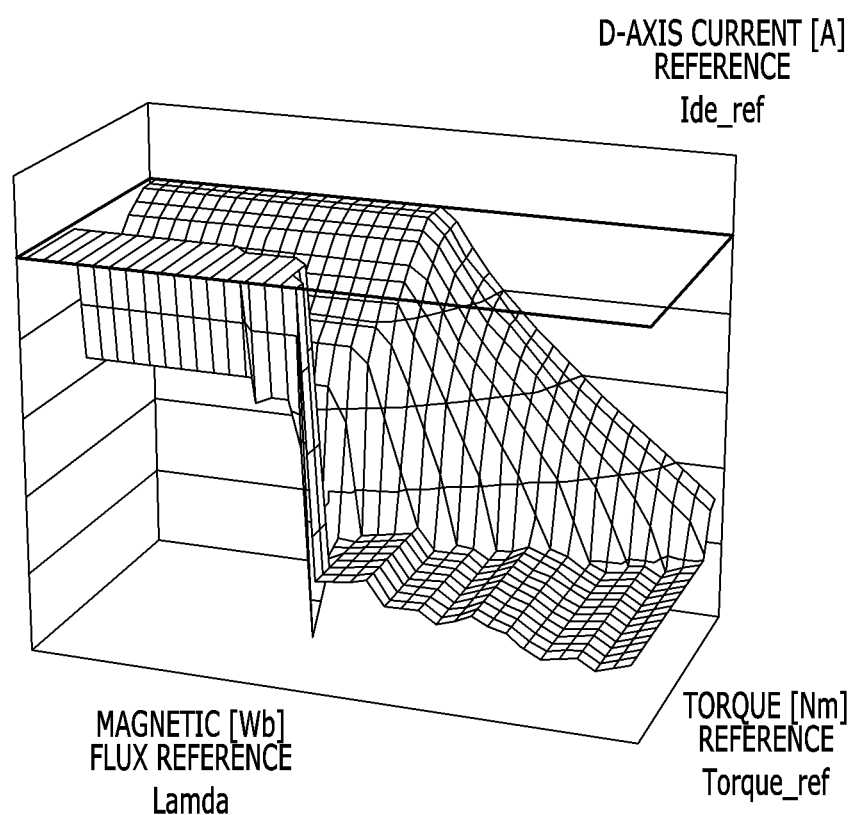
Figure 6B:
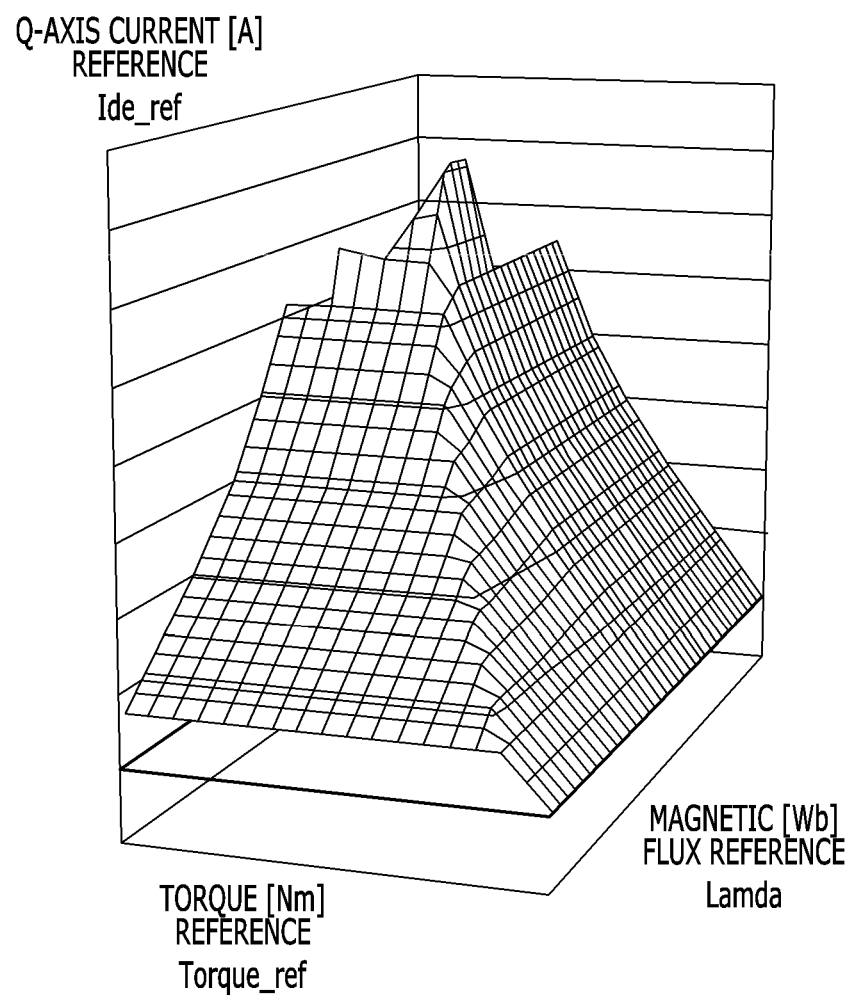

FIG. 6A shows an example of a d-axis current map included in a first stator current map generated from a field current value $i_f$ of 4 ampere [A], and FIG. 6B shows an example of a q-axis current map included in the first stator current map generated from the field current value $i_f$ of 4 ampere [A].

Figure 7A:
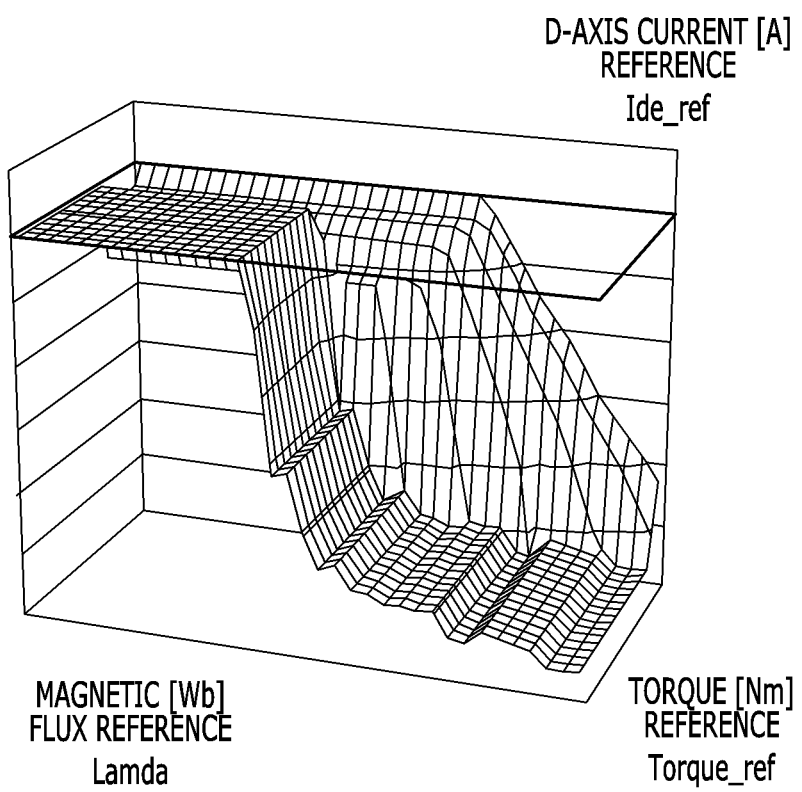
Figure 7B:
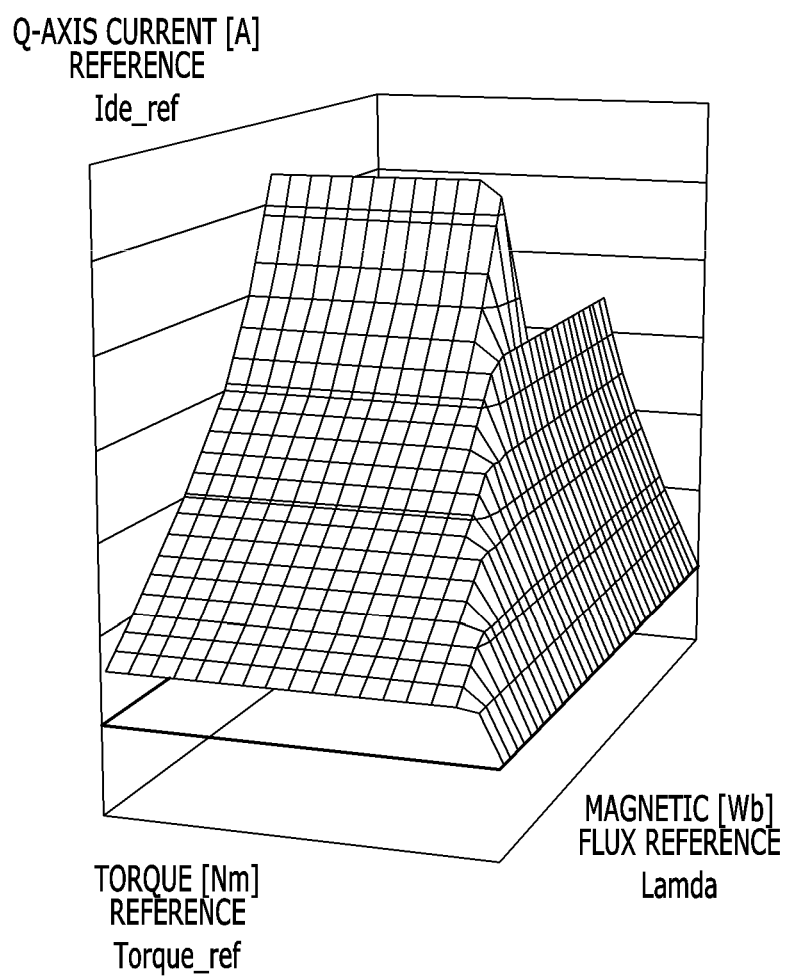

FIG. 7A shows an example of a d-axis current map included in a first stator current map generated from a field current value $i_f$ of 2 ampere [A], and FIG. 7B shows an example of a q-axis current map included in the first stator current map generated from the field current value $i_f$ of 2 ampere [A].

Figure 8A:
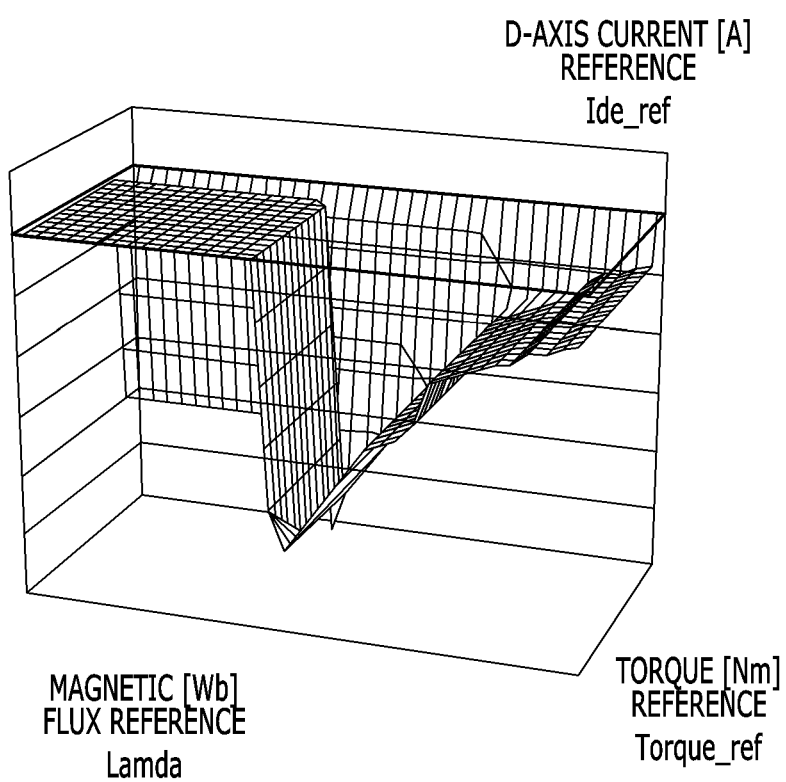
Figure 8B:
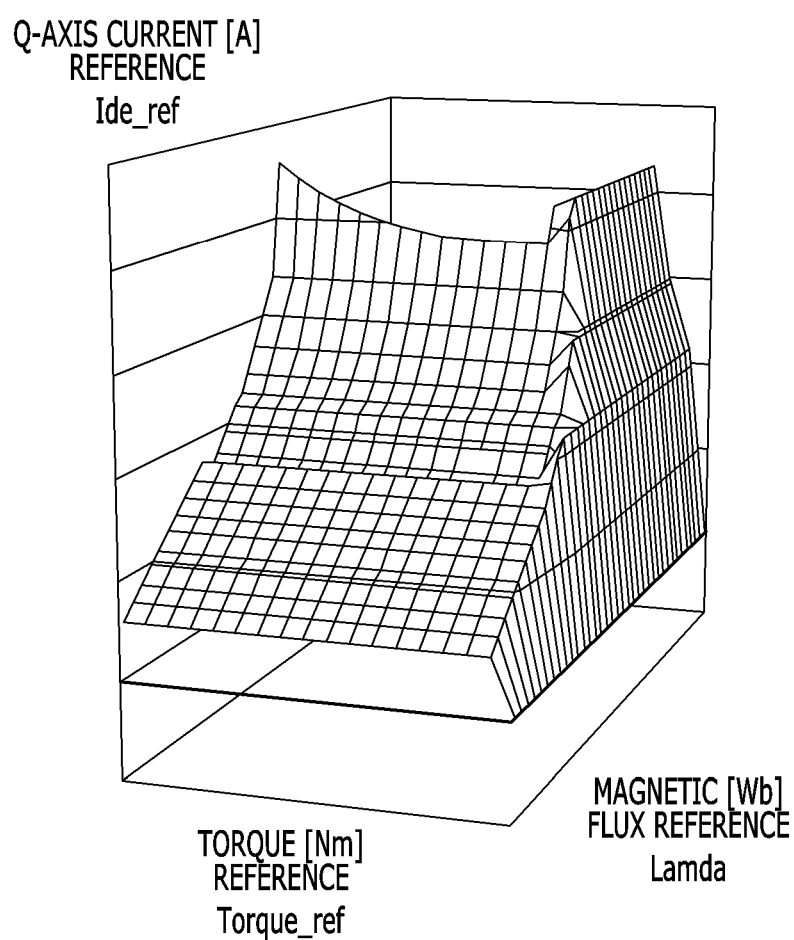

FIG. 8A shows an example of a d-axis current map included in a first stator current map generated from a field current value $i_f$ of 0 ampere [A], and FIG. 8B shows an example of a q-axis current map included in the first stator current map generated from the field current value $i_f$ of 0 ampere [A].

Generation of Second Stator Current Map 172-7 Used for Maximum Efficiency Control In the second stator current map 172-7 used for the maximum efficiency control, a d-axis current reference value and a q-axis current reference value which satisfy the filtered torque reference value $T_{e1}^*$ generated through low-pass filtering and where the motor M operates at maximum efficiency may be set based on a magnetic flux reference value and a response characteristic of a field current. That is, a process of generating the second stator current map 172-7 may be a process of searching for a d-axis current reference value and a q-axis current reference value corresponding to maximum-efficiency operating points, based on a field current, a d-axis current, and a q-axis current.

Figure 9A:
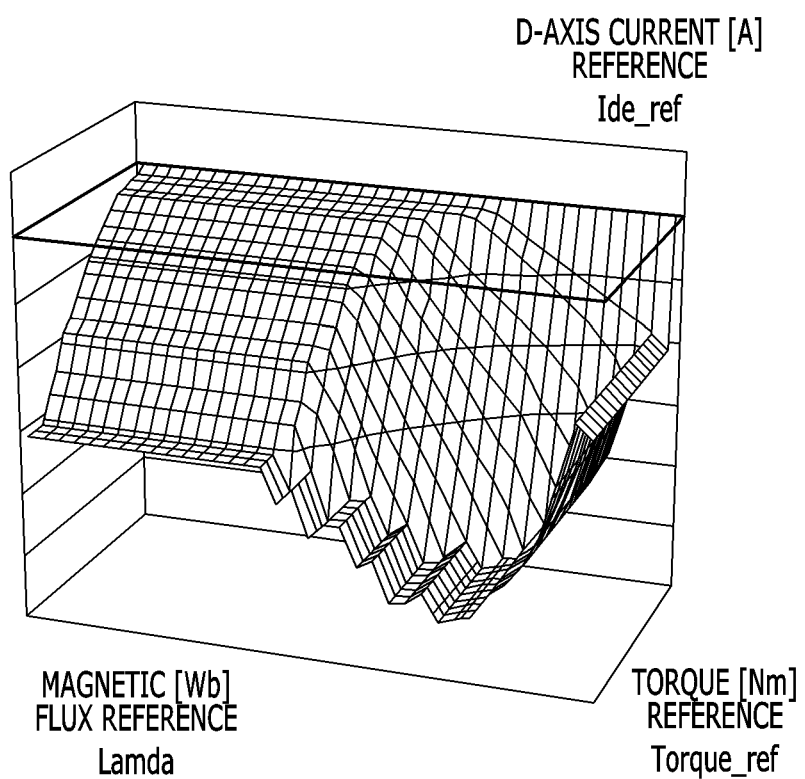
FIGS. 9A and 9B are diagrams showing three-dimensional (3D) graphs of a second stator current map according to an exemplary embodiment.
Figure 9B:
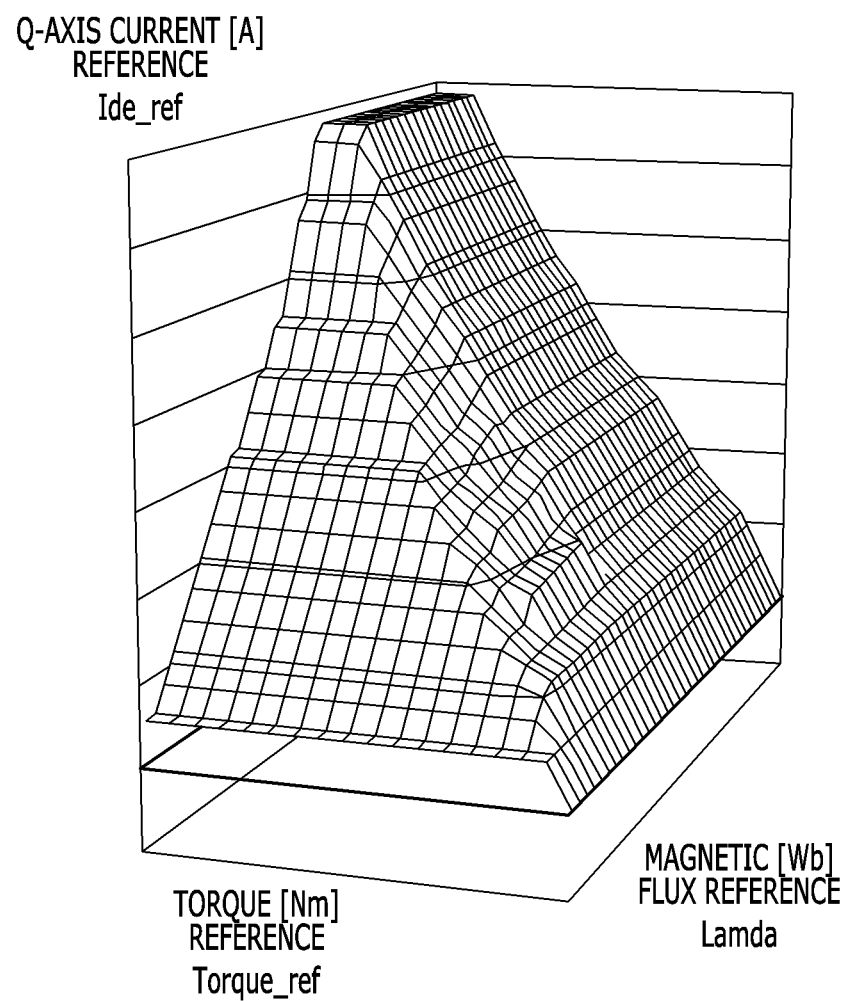

FIGS. 9A and 9B are diagrams showing 3D graphs of a second stator current map according to an exemplary embodiment. FIG. 9A shows an example of a d-axis current map included in the second stator current map, and FIG. 9B shows an example of a q-axis current map included in the second stator current map.

Generation of Field Current Maps 174-1 and 174-2 Used for Maximum Efficiency Control A process of generating the first field current map 174-1 used for the quick-response torque control mode may be a process of setting a field current reference value $i_f^*$ which satisfies a torque reference value and a magnetic flux reference value, quickly follows a torque reference, and allows the motor M to operate at minimized motor loss. That is, the process of generating the first field current map 174-1 may be a process of searching for a d-axis current reference value and a q-axis current reference value corresponding to maximum-efficiency operating points which satisfy both the torque response and the maximum efficiency of the motor, based on a field current, a d-axis current, and a q-axis current.

In the second field current map 172-4 used for the maximum efficiency control, the field current reference value $i_f^*$ which enables the motor M to operate at maximum efficiency may be set when the filtered torque reference value $T_{e1}^*$ generated by low-pass filtering the torque reference value $T_e^*$ is satisfied, based on a magnetic flux reference value and a response characteristic of a field current.

Figure 10:
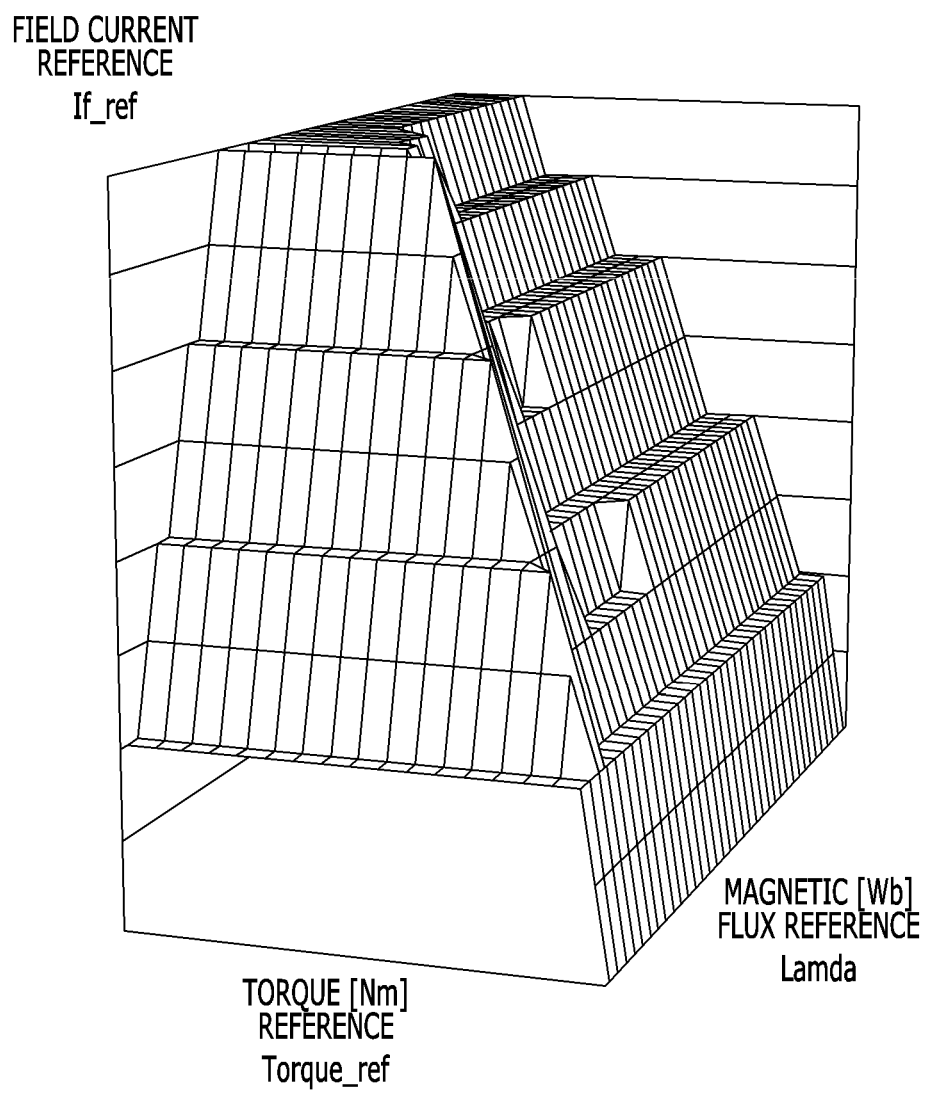
FIG. 10 is a diagram showing a 3D graph of a field current map according to an exemplary embodiment.

In FIG. 10, a 3D graph of the first field current map 174-1 is shown.

Figure 11:
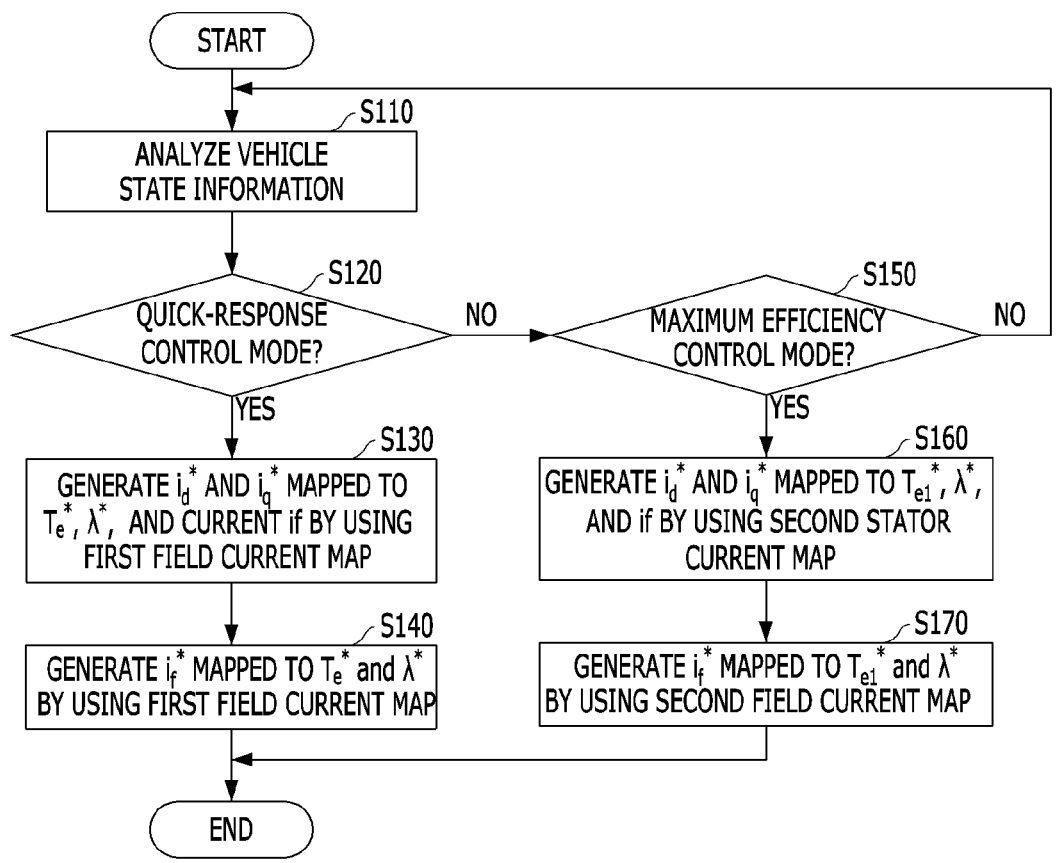
FIG. 11 is a flowchart illustrating a current reference generation method using the motor control apparatus for vehicles illustrated in FIG. 2, according to an exemplary embodiment.

FIG. 11 is a flowchart illustrating a current reference generation method using the motor control apparatus for vehicles illustrated in FIG. 2, according to an exemplary embodiment. In describing the following operations, a detailed illustration of the above description on the motor control apparatus for vehicles is omitted or will be briefly described.

Referring to FIG. 11, an operation (S110) of analyzing, by the control mode determiner 140, vehicle state information received from the upper controller may be performed.

Subsequently, an operation (S120) of determining a control mode of the motor M as a quick-response torque control mode or an operation (S150) of determining the control mode of the motor M as a maximum efficiency control mode may be performed based on a result of the analysis of the vehicle state information by the control mode determiner 140.

Subsequently, when the control mode determiner 140 determines the control mode of the motor M as the quick-response torque control mode, an operation (S130) may to performed to generate stator current reference values $i_d^*$ and $i_q^*$ mapped to a torque reference value $T_e^*$, a magnetic flux reference value $\lambda^*$, and a current field current value $i_f$ by using the first stator current map 172-5 which has been previously obtained preferentially based on a torque response characteristic of the motor M, and an operation (S140) may be performed to generate a field current reference value $i_f^*$ mapped to the torque reference value $T_e^*$ and the magnetic flux reference value $\lambda^*$ by using the first field current map 174-1 which has been previously obtained preferentially based on the torque response characteristic of the motor M.

Although not shown, after the stator current reference values $i_d^*$ and $i_q^*$ and the field current reference value $i_f^*$ are generated, stator voltage reference values $V_d^*$ and $V_q^*$ may be calculated from the stator current reference values $i_d^*$ and $i_q^*$, a field voltage reference values $V_f^*$ may be calculated from the field current reference value $i_f^*$, an operation of the stator inverter 114 may be controlled at a PWM duty ratio corresponding to the stator voltage reference values $V_d^*$ and $V_q^*$, and an operation of the field inverter 112 may be controlled at a PWM duty ratio corresponding to the field voltage reference value $V_f^*$. Therefore, the motor M quickly follows a reference torque, thereby improving torque response characteristic.

On the other hand, when the control mode determiner 140 determines the control mode of the motor M as the maximum efficiency control mode, an operation (S150) may be performed to generate stator current reference values $i_d^*$ and $i_q^*$ mapped to a filtered torque reference value $T_{e1}^*$ generated through low-pass filtering, the magnetic flux reference value $\lambda^*$, and the current field current value $i_f$ by using the second stator current map 172-7 which has been previously obtained preferentially based on a maximum efficiency of the motor M, and an operation (S160) may be performed to generate a field current reference value $i_f^*$ mapped to the torque reference value $T_e^*$ and the magnetic flux reference value $\lambda^*$ by using the second field current map 174-2 which has been previously obtained preferentially based on the maximum efficiency of the motor M.

Although not shown, after the operation (S160), stator voltage reference values $V_d^*$ and $V_q^*$ may be calculated from the stator current reference values $i_d^*$ and $i_q^*$, a field voltage reference values $V_f^*$ may be calculated from the field current reference value $i_f^*$, an operation of the stator inverter 114 may be controlled at a PWM duty ratio corresponding to the stator voltage reference values $V_d^*$ and $V_q^*$, and an operation of the field inverter 112 may be controlled at a PWM duty ratio corresponding to the field voltage reference value $V_f^*$. Therefore, the motor M may operate at maximum-efficiency operating points, thereby improving an efficiency of the motor M.

Figure 12:
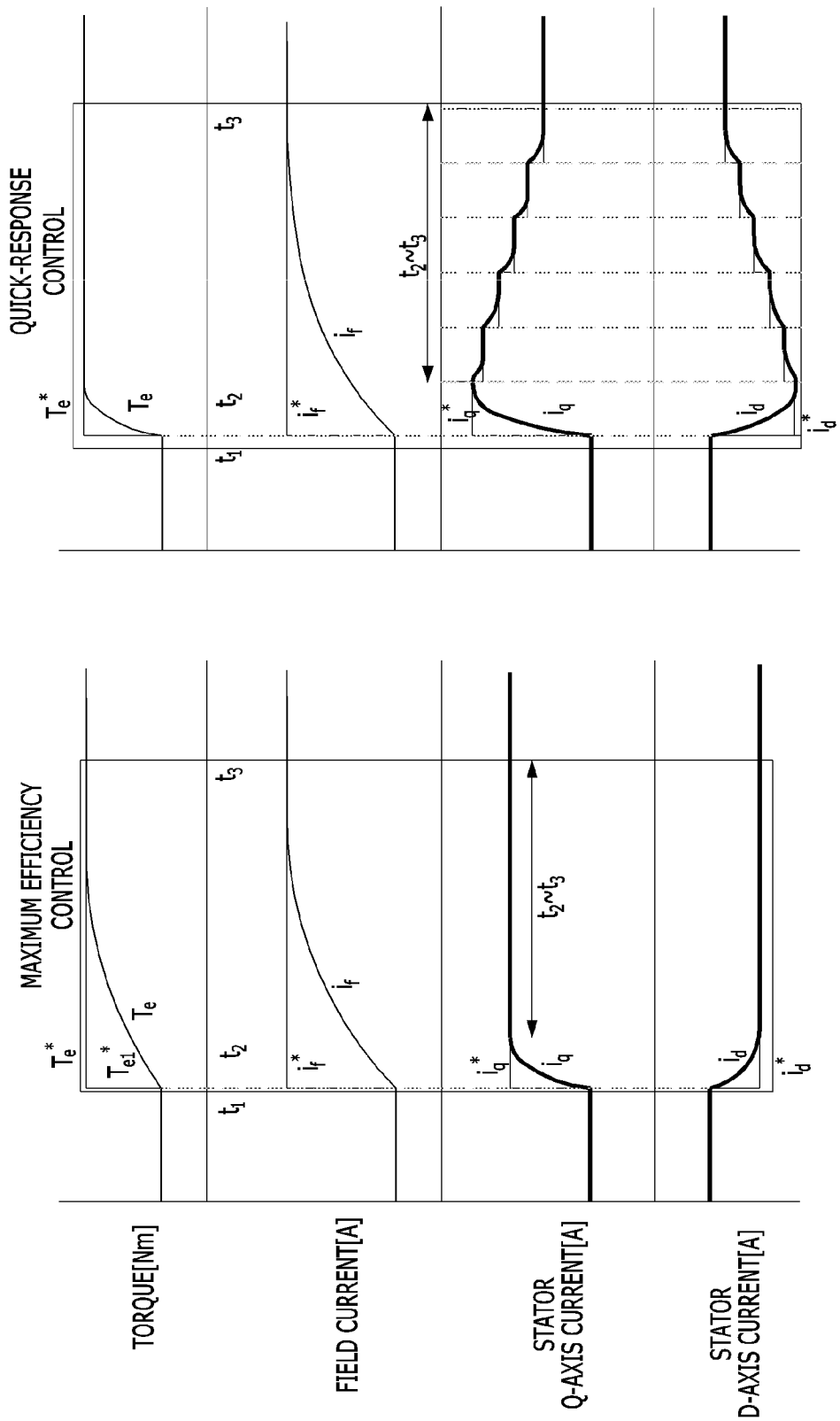
FIG. 12 is a graph showing a response characteristic of a motor in a quick-response torque control mode and a response characteristic of the motor in a maximum efficiency control mode, according to an exemplary embodiment.

As shown in FIG. 12, when the motor control apparatus for vehicles according to an exemplary embodiment operates in the quick-response torque control mode, it can be seen that in comparison with the related art, torque response characteristic is certainly improved in a problem region "$t_2$-$t_3$", and moreover, an efficiency of a motor is improved.

Moreover, when the motor control apparatus for vehicles according to an exemplary embodiment operates in the maximum efficiency control mode, it can be seen that although less than the degree to which the torque response characteristic is improved in the quick-response torque control mode, in comparison with the relate art, the torque response characteristic is improved in at least a problem region "$t_2$-$t_3$", and moreover, the efficiency of the motor is improved.

According to the exemplary embodiments, a current reference value may be generated based on a level of a field current (or a field current value) flowing in a field coil, and a motor for vehicles may be controlled by the current reference value, thereby enhancing torque response characteristic and operating the motor at maximum efficiency.

Moreover, according to the exemplary embodiments, a design is not needed where the number of turns of the field coil is reduced for improving the torque response characteristic of the motor, and a size of a power semiconductor of a field inverter increases for increasing the level of the field current.

A number of exemplary embodiments and implementations have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, the inventive concept is not limited to such embodiments, but rather to the broader scope of the presented claims and various obvious modifications and equivalent arrangements.

What is claimed is:

1. A motor control apparatus for vehicles comprising:
   a stator current reference generator configured to generate a stator current reference value mapped to a torque reference value $T_e^*$, a magnetic flux reference value $\lambda^*$, and a current field current value $i_f$ flowing in a field coil by using a first stator current map in a quick-response torque control mode, and generate a stator current reference value mapped to a filtered torque reference value $T_{e1}^*$ generated by filtering the torque reference value $T_e^*$, the magnetic flux reference value $\lambda^*$, and the field current value $i_f$ by using a second stator current map in a maximum efficiency control mode;
   a field current reference generator configured to generate a field current reference value mapped to the torque reference value $T_e^*$ and the magnetic flux reference value $\lambda^*$ by using a first field current map in the quick-response torque control mode, and generate a field current reference value mapped to the filtered torque reference value $T_{e1}^*$ and the magnetic flux reference value $\lambda^*$ by using a second field current map in the maximum efficiency control mode;
   a pulse width modulation (PWM) controller configured to apply a first PWM signal corresponding to the stator current reference value to a stator inverter and apply a second PWM signal corresponding to the field current reference value to a field inverter, thereby controlling a torque response characteristic and a maximum efficiency of a vehicle motor driven by the stator inverter and the field inverter;
   a control mode determiner configured to determine the quick-response torque control mode or the maximum efficiency control mode, based on vehicle driving speed information and vehicle battery charging amount information received from an upper controller; and
   a path generator configured to generate a first path or a second path according to one of the control modes determined by the control mode determiner.

2. The motor control apparatus of claim 1, wherein the first stator current map comprises a plurality of d-axis current maps and a plurality of q-axis current maps classified by levels of the current field current value $i_f$,
   each of the plurality of d-axis current maps stores a plurality of d-axis current reference values $i_d^*$ which have been previously obtained in order for loss of the vehicle motor to be the minimum in a level of the current field current value $i_f$, the torque reference value $T_e^*$, and the magnetic flux reference value $\lambda^*$, and
   each of the plurality of q-axis current maps stores a plurality of q-axis current reference values $i_q^*$ which have been previously obtained in order for loss of the vehicle motor to be the minimum in the level of the current field current value $i_f$, the torque reference value $T_e^*$, and the magnetic flux reference value $\lambda^*$.

3. The motor control apparatus of claim 1, wherein the second stator current map comprises:
   a d-axis current map configured to store a plurality of d-axis current reference values $i_d^*$ which have been previously obtained in order for the vehicle motor to operate at maximum efficiency in the filtered torque reference value $T_{e1}^*$ and the magnetic flux reference value $\lambda^*$; and
   a q-axis current map configured to store a plurality of q-axis current reference values $i_q^*$ which have been previously obtained in order for the vehicle motor to operate at the maximum efficiency in the filtered torque reference value $T_{e1}^*$ and the magnetic flux reference value $\lambda^*$.

4. The motor control apparatus of claim 1, wherein the first field current map stores a plurality of field current reference values $i_f^*$ which have been previously obtained in order for the vehicle motor to operate at maximum efficiency in the torque reference value $T_e^*$ and the magnetic flux reference value $\lambda^*$.

5. The motor control apparatus of claim 1, wherein the second field current map stores a plurality of field current reference values $i_f^*$ which have been previously obtained in order for the vehicle motor to operate at maximum efficiency in the filtered torque reference value $T_{e1}^*$ and the magnetic flux reference value $\lambda^*$.

6. The motor control apparatus of claim 1, further comprising:
   a low pass filter configured to low-pass filter the torque reference value $T_e^*$ received through the second path to generate the filtered torque reference value $T_{e1}^*$, and output the filtered torque reference value $T_{e1}^*$ to the second stator current map and the second field current map.

7. The motor control apparatus of claim 1, wherein the first path is a path through which the torque reference value $T_e^*$ is transferred to the first stator current map and the first field current map.

8. A current reference generation method comprising:
   generating a stator current reference value mapped to a torque reference value $T_e^*$, a magnetic flux reference value $\lambda^*$, and a current field current value $i_f$ flowing in a field coil by using a first stator current map in a quick-response torque control mode, and generating a stator current reference value mapped to a filtered torque reference value $T_{e1}^*$ generated by filtering the torque reference value $T_e^*$, the magnetic flux reference value $\lambda^*$, and the field current value $i_f$ by using a second stator current map in a maximum efficiency control mode;
   generating a field current reference value mapped to the torque reference value $T_e^*$ and the magnetic flux reference value $\lambda^*$ by using a first field current map in the quick-response torque control mode, and generating a field current reference value mapped to the filtered torque reference value $T_{e1}^*$ and the magnetic flux reference value $\lambda^*$ by using a second field current map in the maximum efficiency control mode;
   applying a first pulse width modulation (PWM) signal corresponding to the stator current reference value to a stator inverter and applying a second PWM signal corresponding to the field current reference value to a field inverter, and controlling a torque response characteristic and a maximum efficiency of a vehicle motor driven by the stator inverter and the field inverter;

determining the quick-response torque control mode or the maximum efficiency control mode, based on vehicle driving speed information and vehicle battery charging amount information received from an upper controller;

and generating a first path or a second path according to one of the determined control modes.

9. The current reference generation method of claim 8, wherein the first stator current map comprises a plurality of d-axis current maps and a plurality of q-axis current maps classified by levels of the current field current value $i_f$, each of the plurality of d-axis current maps stores a plurality of d-axis current reference values $i_d^*$ which have been previously obtained in order for loss of the vehicle motor to be the minimum in a level of the current field current value $i_f$, the torque reference value $T_e^*$, and the magnetic flux reference value $\lambda^*$, and each of the plurality of q-axis current maps stores a plurality of q-axis current reference values $i_q^*$ which have been previously obtained in order for loss of the vehicle motor to be the minimum in the level of the current field current value $i_f$, the torque reference value $T_e^*$, and the magnetic flux reference value $\lambda^*$.

10. The current reference generation method of claim 8, wherein the second stator current map comprises:

a d-axis current map configured to store a plurality of d-axis current reference values $i_d^*$ which have been previously obtained in order for the vehicle motor to operate at maximum efficiency in the filtered torque reference value $T_{e1}^*$ and the magnetic flux reference value $\lambda^*$; and a q-axis current map configured to store a plurality of q-axis current reference values $i_q^*$ which have been previously obtained in order for the vehicle motor to operate at the maximum efficiency in the filtered torque reference value $T_{e1}^*$ and the magnetic flux reference value $\lambda^*$.

11. The current reference generation method of claim 8, wherein the first field current map stores a plurality of field current reference values $i_f^*$ which have been previously obtained in order for the vehicle motor to operate at maximum efficiency in the torque reference value $T_e^*$ and the magnetic flux reference value $\lambda^*$.

12. The current reference generation method of claim 8, wherein the second field current map stores a plurality of field current reference values $i_f^*$ which have been previously obtained in order for the vHehicle motor to operate at maximum efficiency in the filtered torque reference value $T_{e1}^*$ and the magnetic flux reference value $\lambda^*$.

* * * * *